(12) United States Patent
Sato

(10) Patent No.: US 10,616,431 B2
(45) Date of Patent: Apr. 7, 2020

(54) DOCUMENT SCANNING APPARATUS AND CONTROL METHOD FOR DOCUMENT SCANNING APPARATUS

(71) Applicant: CANON KABUSHIKI KAISHA, Tokyo (JP)

(72) Inventor: Yoshikazu Sato, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/444,159

(22) Filed: Feb. 27, 2017

(65) Prior Publication Data

US 2017/0257506 A1 Sep. 7, 2017

(30) Foreign Application Priority Data

Mar. 1, 2016 (JP) ................. 2016-039253

(51) Int. Cl.
*H04N 1/04* (2006.01)
*H04N 1/00* (2006.01)
*H04N 1/10* (2006.01)

(52) U.S. Cl.
CPC ..... *H04N 1/00896* (2013.01); *H04N 1/00588* (2013.01); *H04N 1/00602* (2013.01); *H04N 1/00687* (2013.01); *H04N 1/00734* (2013.01); *H04N 1/00742* (2013.01); *H04N 1/00779* (2013.01); *H04N 1/1061* (2013.01); *H04N 2201/0094* (2013.01)

(58) Field of Classification Search
CPC ........... H04N 1/00896; H04N 1/00588; H04N 1/00602; H04N 1/00687; H04N 1/00734; H04N 1/00742; H04N 1/00779; H04N 1/1061; H04N 2201/0094

USPC .......................... 358/488, 496, 498, 475, 509
See application file for complete search history.

(56) References Cited

U.S. PATENT DOCUMENTS

| 7,804,627 B2 * | 9/2010 | Horiguchi | .......... H04N 1/00681 358/474 |
| 2006/0269312 A1 * | 11/2006 | Muraishi | ............ G03G 15/5004 399/88 |
| 2007/0206211 A1 * | 9/2007 | Okutsu | ................. G03G 15/50 358/1.14 |

(Continued)

FOREIGN PATENT DOCUMENTS

| JP | 2006-243238 A | 9/2006 |
| JP | 2010-183367 A | 8/2010 |

(Continued)

*Primary Examiner* — Cheukfan Lee
(74) *Attorney, Agent, or Firm* — Canon U.S.A., Inc. IP Division

(57) ABSTRACT

A document scanning apparatus reading an image of a document includes a signal output unit configured to output a pulse signal at predetermined intervals, a sensor configured to detect a document set on a platen glass, the sensor having a light emitting unit configured to emit light in response to a pulse signal output from the signal output unit and a light receiving unit configured to output a detection signal in accordance with light output from the light emitting unit, and a control unit configured to receive the detection signal output from the light receiving unit. In this case, the signal output unit outputs the pulse signal at a different time point from the predetermined intervals in response to a request from an external apparatus.

17 Claims, 12 Drawing Sheets

(56) References Cited

U.S. PATENT DOCUMENTS

| | | | | |
|---|---|---|---|---|
| 2009/0040560 A1* | 2/2009 | Yukiura | ................... | H04N 1/12 |
| | | | | 358/1.16 |
| 2011/0058881 A1* | 3/2011 | Mitamura | .............. | G03G 15/60 |
| | | | | 400/582 |
| 2012/0113488 A1* | 5/2012 | Machida | ................ | B65H 3/063 |
| | | | | 358/498 |
| 2015/0249767 A1* | 9/2015 | Utsumi | .............. | H04N 1/00551 |
| | | | | 358/1.14 |
| 2017/0126912 A1* | 5/2017 | Shuto | .................... | B65H 3/063 |

FOREIGN PATENT DOCUMENTS

| | | | | |
|---|---|---|---|---|
| JP | 2010183367 A | * | 8/2010 | |
| JP | 2011-041129 A | | 2/2011 | |
| JP | 2011041129 A | * | 2/2011 | |
| JP | 2015-140003 A | | 8/2015 | |
| JP | 2015-165620 A | | 9/2015 | |
| KR | 10-2015-0139403 A | | 12/2015 | |
| KR | 20150139403 A | * | 12/2015 | |

* cited by examiner

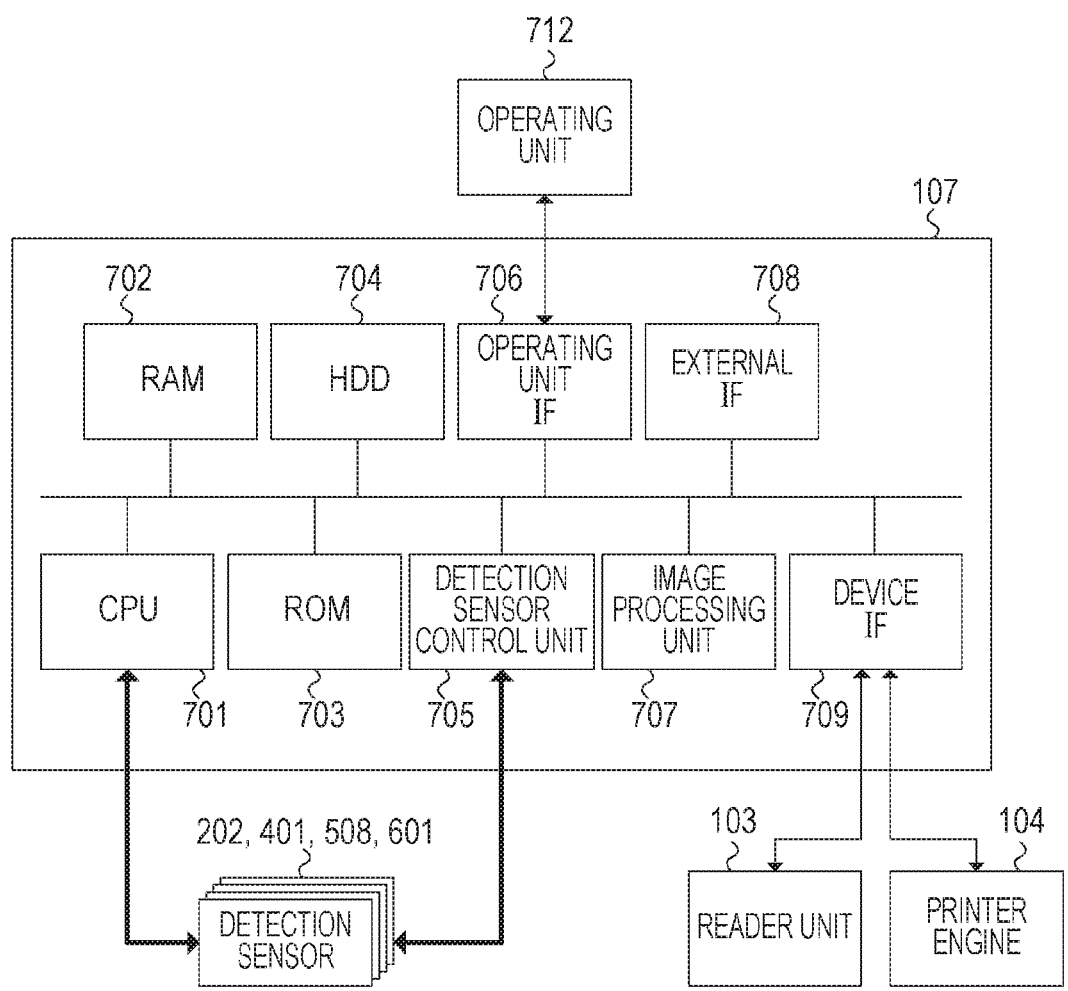

Comparison Example ns shown in FIG. 3A is a partially enlarged view of

DOCUMENT SCANNING APPARATUS AND CONTROL METHOD FOR DOCUMENT SCANNING APPARATUS

BACKGROUND OF THE INVENTION

Field of the Invention

The present invention relates to a document scanning apparatus including a sensor and a control method for a document scanning apparatus.

Description of the Related Art

Conventionally, image forming apparatuses each including an auto document feeder (ADF) have been used. Such an auto document feeder may often include a combination of a photo interrupter and a movable flag as a document detection unit configured to detect whether a document bundle is set on a document platen or not. The movable flag may shield or transmit light from a light emitting unit in the photo interrupter in accordance with a result of determination on whether a document bundle is set on a document platen or not. This changes an output signal from the photo interrupter so that whether a document bundle is set on the document platen or not can be detected.

In general, an infrared light emitting diode (infrared LED) may be used as such a light emitting unit in a photo interrupter. Power of several hundreds mW may be required for causing the infrared LED to emit light. For that, when the infrared LED is caused to emit light at all times, the power consumption of the image forming apparatus increases correspondingly.

As a technology relating to the power consumption, Japanese Patent Laid-Open No. 2006-243238 discloses an auto document feeder as will be described below. The auto document feeder according to Japanese Patent Laid-Open No. 2006-243238 includes a document setting detection sensor configured to detect that a document bundle has been set on a document platen. A document setting detection sensor includes a light emitting unit and a light receiving unit and intermittently drives the light emitting unit to cause discontinuous energization to the document setting detection sensor.

SUMMARY OF THE INVENTION

However, according to Japanese Patent Laid-Open No. 2006-243238, a CPU contained in a controller for the auto document feeder is responsible for control of the light emitting unit. This may prevent reduction of power consumption of the auto document feeder as a whole.

In order to reduce power consumption of an image forming apparatus, control over light-on and light off of an infrared LED therein may be off-loaded to a low power consumption module other than a CPU. In a case where control over light-on and light-off operations of an infrared LED is off-loaded, the power consumption can be reduced while it is difficult for the CPU to monitor a detection signal simultaneously with light-on timing of the infrared. LED. In other words, the CPU may sometimes monitor a detection signal even at a time when the infrared LED lights off. Judgment on whether a document is set on a document platen or not may require processing for separating such a detection signal result, which, however, may impose an increased processing load on the CPU.

The present invention was made in view of the situation as described above and may prevent an increase a processing load upon detection of a target state of a document.

According to an aspect of the present invention, a document scanning apparatus reading an image of a document includes a signal output unit configured to output a pulse signal at predetermined intervals, a sensor configured to detect a document set on a platen glass, the sensor having a light emitting unit configured to emit light in response to a pulse signal output from the signal output unit and a light receiving unit configured to output a detection signal in accordance with light output from the light emitting unit, and a control unit configured to receive the detection signal output from the light receiving unit. In this case, the signal output unit outputs the pulse signal at a different time point from the predetermined intervals in response to a request from an external apparatus.

Further features of the present invention will become apparent from the following description of exemplary embodiments with reference to the attached drawings.

BRIEF DESCRIPTION OF THE DRAWINGS

FIG. 3A is a partially enlarged view of the ADF in which a document bundle is not set on a document tray, and FIG. 3B is a partially enlarged view of the ADF in which a document bundle is set on the document tray.

FIG. 4A illustrates a state that the ADF is closed, and FIG. 4B illustrates a state that the ADF is open.

FIG. 5A illustrates a state that a manual feed tray is closed, FIG. 5B illustrates a state that the manual feed tray is open, and FIG. 5C illustrates a partially enlarged view of the printer engine.

FIG. 6A illustrates a state that the paper cassette is drawn, and FIG. 6B illustrates a state that the paper cassette is pushed in.

FIG. 7 illustrates a hardware configuration of a controller.

DESCRIPTION OF THE EMBODIMENTS

First Embodiment

Figure 1:
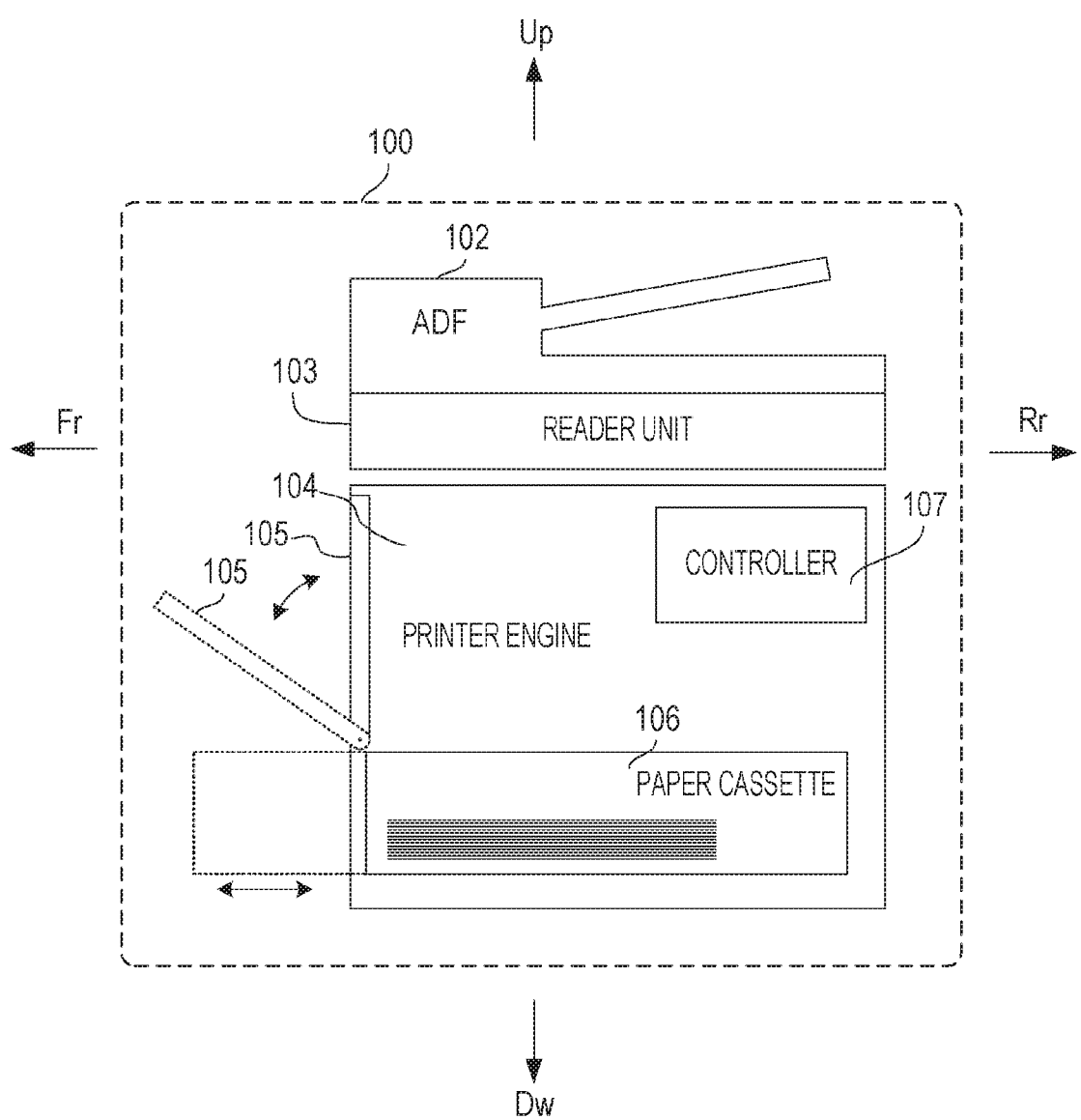
FIG. 1 is a sectional view illustrating a configuration of an image forming apparatus.

First, with reference to FIG. 1, an image forming apparatus 100 that is an example of a document scanning apparatus will be described. FIG. 1 is a sectional view illustrating a configuration of the image forming apparatus 100.

The image forming apparatus 100 includes functions of a printer, a scanner, and a copying machine, for example. The image forming apparatus 100 has power modes including a normal mode and a power-saving mode in which a lower amount of power is consumed than that of the normal mode and operates in one of the modes. The image forming apparatus 100 includes an auto document feeder (ADF) 102, a reader unit 103, a printer engine 104, and a controller 107.

The ADF 102 is configured to automatically convey a document to the reader unit 103. It should be understood that the ADF 102 is an example of a document conveying unit according to the present invention.

The reader unit 103 is configured to read a document conveyed from the ADF 102.

The printer engine 104 is configured to print an image, for example, read by the reader unit 103 on a sheet and outputs the printed sheet. The printer engine 104 has a manual feed tray 105 and a paper cassette 106.

The manual feed tray 105 is a member on which a sheet is set by a user for printing on a manually fed sheet in the image forming apparatus 100. A sheet set on the manual feed tray 105 is conveyed to the printer engine 104 for printing. The manual feed tray 105 can be drawn (closably) from a side of the printer engine 104. FIG. 1 illustrates a solid line indicating the closed manual feed tray 105 on which a user cannot set a sheet on the manual feed tray 105. FIG. 1 further illustrates a broken line indicating the open manual feed tray 105 that is drawn from the printer engine 104 on which a user can set a sheet.

The paper cassette 106 is configured to store sheets to be used by the printer engine 104. For printing in the printer engine 104, the paper cassette 106 pulls out a sheet stored within the paper cassette 106 one by one and conveys it to the printer engine 104, excluding a case where the printer engine 104 prints on a manually fed sheet. The paper cassette 106 can be drawn from the printer engine 104. FIG. 1 illustrates another solid line indicating the paper cassette 106 that is accommodated in the printer engine 104 and can supply a sheet to the printer engine 104. FIG. 1 further illustrates another broken line indicating the paper cassette 106 that is drawn from the printer engine 104. When the paper cassette 106 is drawn from the printer engine 104, a user can supply a sheet to the paper cassette 106. The paper cassette 106 may further be drawn from the state indicated by the broken line in FIG. 1 so that it can be removed. In other words, the paper cassette 106 may be detachably mounted to the printer engine 104.

The manual feed tray 105 and the paper cassette 106 may not necessarily be drawn (or opened) for use.

The controller 107 is configured to control the ADF 102, the reader unit 103, and the printer engine 104.

FIG. 1 illustrates Up, Dw, Fr and Rr indicating, respectively, an upward direction from the reader unit 103 to the ADF 102, a downward direction that is the opposite direction of the upper Up, a front direction in which the paper cassette 106 is drawn, and a rear direction that is the opposite direction of the front Fr.

Figure 2:
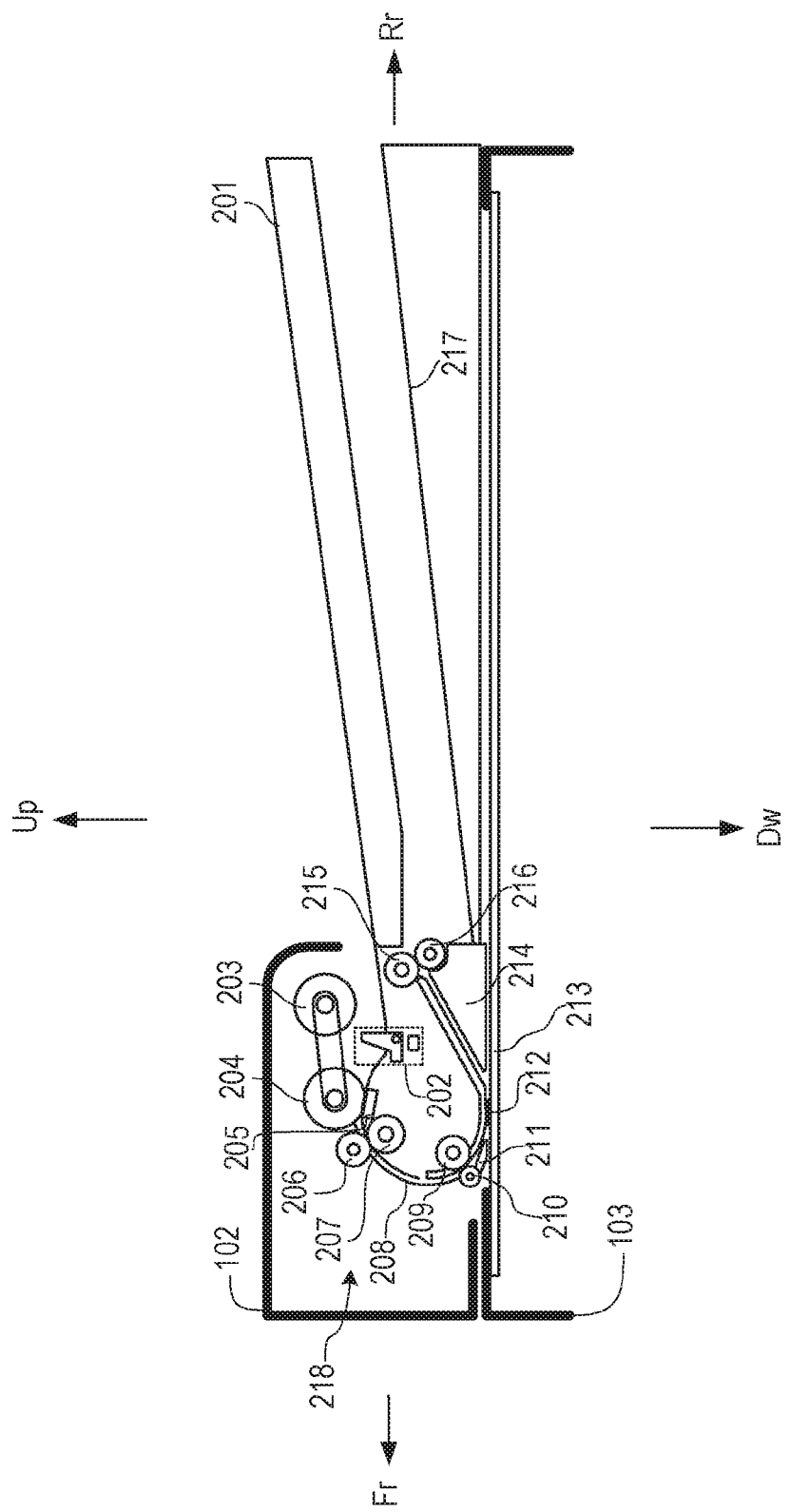
FIG. 2 is a sectional view illustrating a configuration of an ADF.

Next, with reference to FIG. 2, a configuration of the ADF 102 will be described. FIG. 2 is a sectional view illustrating a configuration of the ADF 102.

The ADF 102 includes a document tray 201, a document detection sensor 202, a discharge tray 217, and a document pulling mechanism 218.

A document bundle may be set on the document tray 201.

The document detection sensor 202 is configured to detect a document setting state of the ADF 102. The ADF 102 may have a document setting state that a document bundle is set on the document tray 201 or that a document bundle is not set on the document tray 201. The document detection sensor 202 is an example of a sensor unit according to the present invention.

The discharge tray 217 is a discharge destination of a document read by the reader unit 103 and is configured to store a document read by the reader unit 103.

The document pulling mechanism 218 is configured to pull a document one by one from a document bundle set on the document tray 201, convey it to the reader unit 103, and discharge the document read by the reader unit 103 to the discharge tray 217.

The document pulling mechanism 218 has a pickup roller 203, a separation roller 204, a separation pad 205, a first conveyance roller 206, a carrying roller 207, an inner guide 208, a pre-reading roller 209, a pressure roller 210, and a guide miler 211. The document pulling mechanism 218 further has a discharge guide 214, a discharge roller 215, and a discharge roller 216. The pickup roller 203 pulls a document from a document bundle set on the document tray 201 into the ADF 102. The pickup roller 203 is capable of moving from an upper part of the document tray 201 to a position in contact with a document bundle set on the document tray 201. FIG. 2 illustrates the pickup roller 203 at a position before it moves down.

The separation roller 204 is disposed on the front Fr side of the pickup roller 203. The separation roller 204 is normally in contact with a top document at the top of the document bundle set on the document tray 201 and is configured to apply friction to convey the document at the top of the document bundle separately from the document bundle.

The separation pad 205 is disposed at a position facing the separation roller 204.

The first conveyance roller 206 and the carrying roller 207 face each other and are disposed on the front Fr side of the separation roller 204 and are configured to convey a document separated by the separation roller 204 to the down Dw side along the inner guide 208.

The inner guide 208 is configured to lead a document from a position between the first conveyance roller 206 and the carrying roller 207 to a position between the pre-reading roller 209 and the pressure roller 210.

The pre-reading roller 209 and the pressure roller 210 are disposed at a position on the down Dw side of the first conveyance roller 206 and the carrying roller 207 and are configured to convey a document conveyed by the inner guide 208 to a document reading position 212 in contact with an upper surface of the reader unit 103.

The guide miler 211 is configured to guide a document conveyed by the pre-reading roller 209 to the document reading position 212.

The reader unit 103 has a platen glass 213 on the upper surface and further has, through the platen glass 213, an image sensor, not illustrated, on the down Dw side of the document reading position 212. The document conveyed to the document reading position 212 by the ADF 102 is read by the image sensor in the reader unit 103.

A document having an image read by the image sensor reaches the discharge roller 215 and the discharge roller 216 through the discharge guide 214 and is discharged to the discharge tray 217.

Figure 3A:
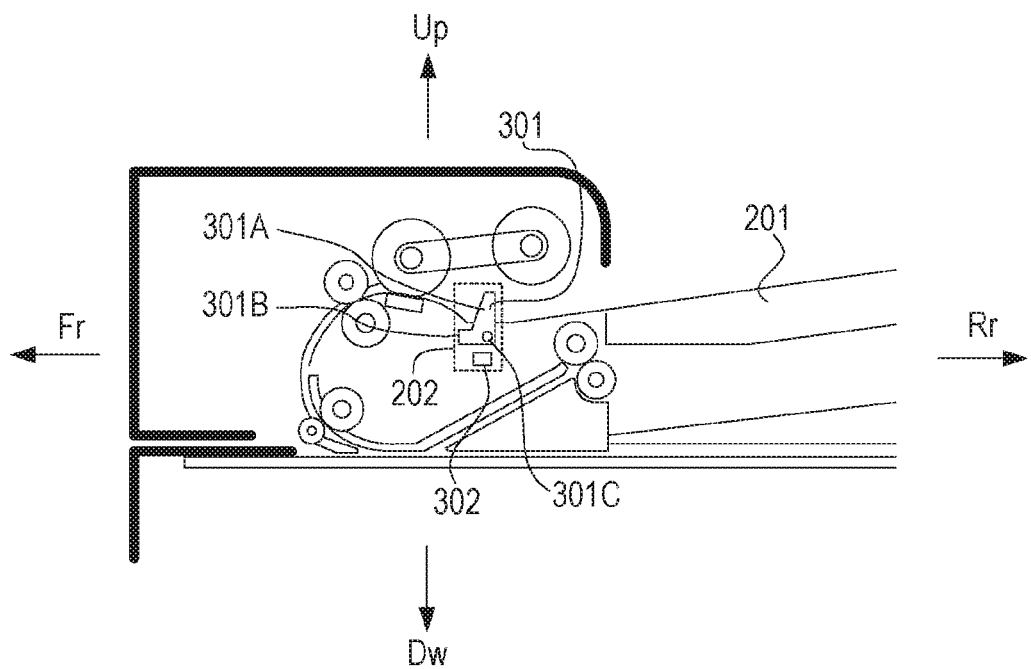
FIGS. 3A and 3B illustrate operations of a document detection sensor.
Figure 3B:
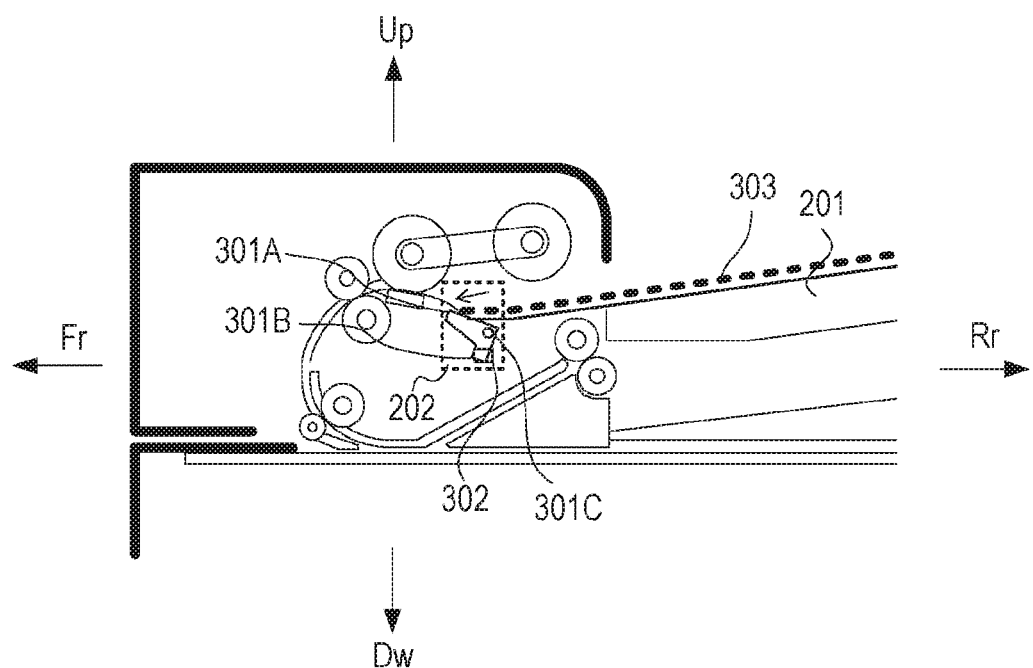

Next, with reference to FIGS. 3A and 3B, the document detection sensor 202 will be described. FIGS. 3A and 3B illustrate operations of the document detection sensor 202.

The document detection sensor 202 has a movable flag 301 and a photo interrupter 302.

The movable flag 301 is disposed at a front Fr end of the document tray 201 and has a state detection unit 301A and a light shield unit 301B which extend in directions orthogonal to each other. The movable flag 301 is rotatable in a predetermined range about a rotation axis 301C which is a connection part of the state detection unit 301A and the light shield unit 301B.

The photo interrupter 302 is disposed at a position on the down Dw direction of the movable flag 301 and includes a light emitting unit and a light receiving unit both of which are provided in a width direction (that is vertical to the front Fr and upper Up sides) of the image forming apparatus 100. The light emitting unit has a luminous body such as an LED. The light receiving unit receives light from the light emitting unit.

In accordance with whether a document bundle is set on the document tray 201 or not, the movable flag 301 may rotate about the rotation axis 301C to either a light shielding position or a non-light-shielding position. With reference to FIG. 3A, the non-light-shielding position of the movable flag 301 will be described. FIG. 3A is a partially enlarged view of the ADF 102 in which a document bundle is not set on the document tray 201.

When a document bundle is not set on the document tray 201, the movable flag 301 is at the non-light-shielding position. The non-light-shielding position is a position where the light shield unit 301B of the movable flag 301 does not shield light emitted from the light emitting unit to the light receiving unit in the photo interrupter 302. According to this embodiment, the non-light-shielding position is a position where the state detection unit 301A is positioned on the upper Up side of the rotation axis 301C and the light shield unit 301B is positioned on the front Fr side of the rotation axis 301C. In this case, because the movable flag 301 does not shield light between the light emitting unit and the light receiving unit in the photo interrupter 302, the light receiving unit can receive light from the light emitting unit.

Next, with reference to FIG. 3B, the light shielding position of the movable flag 301 will be described. FIG. 3B is a partially enlarged view of the ADF 102 in which a document bundle 303 is set on the document tray 201.

When the document bundle 303 is set on the document tray 201, the state detection unit 301A of the movable flag 301 is pressed by the document bundle to the front Fr side so that the movable flag 301 can rotate and the movable flag 301 can be moved to the light shielding position. The light shielding position is a position where the light shield unit 301B of the movable flag 301 shields light emitted from the light emitting unit to the light receiving unit in the photo interrupter 302. When the movable flag 301 is at the light shielding position, the light shield unit 301B in the movable flag 301 enters into between the light emitting unit and the light receiving unit in the photo interrupter 302. Thus, the light receiving unit is prevented from receiving light from the light emitting unit. Therefore, because an output signal from the photo interrupter 302 changes, it can be detected that the document bundle 303 is set on the document tray 201.

Next, with reference to FIGS. 4A and 4B, open and closed states of the ADF 102 will be described.

Figure 4A:
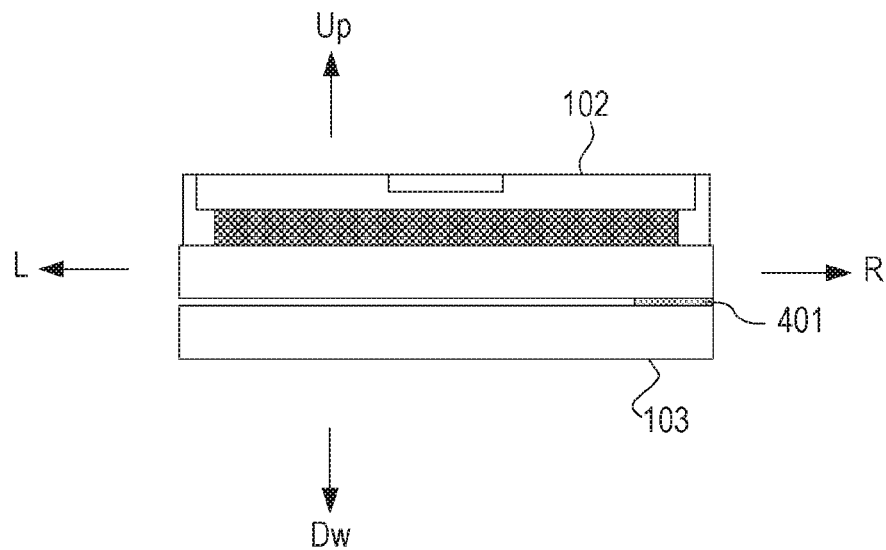
FIGS. 4A and 4B are back views of the ADF and a reader unit in the image forming apparatus.

With reference to FIG. 4A, a state that the ADF 102 is closed will be described. FIG. 4A is a back view from the rear Rr side of the ADF 102 and the reader unit 103 when the ADF 102 is closed.

The closed ADF 102 has a bottom surface at a position facing the platen glass 213 that is an upper surface of the reader unit 103. The ADF 102 also plays a role of a pressing plate unit configured to press a document set on the platen glass 213 to the platen glass 213, and the closed ADF 102 presses a document set on the platen glass 213 to the platen glass 213.

Next, with reference to FIG. 4B, the ADF 102 having an open state will be described. FIG. 4B is a back view from the rear Rr side of the ADF 102 and reader unit 103 where the ADF 102 is open.

Figure 4B:
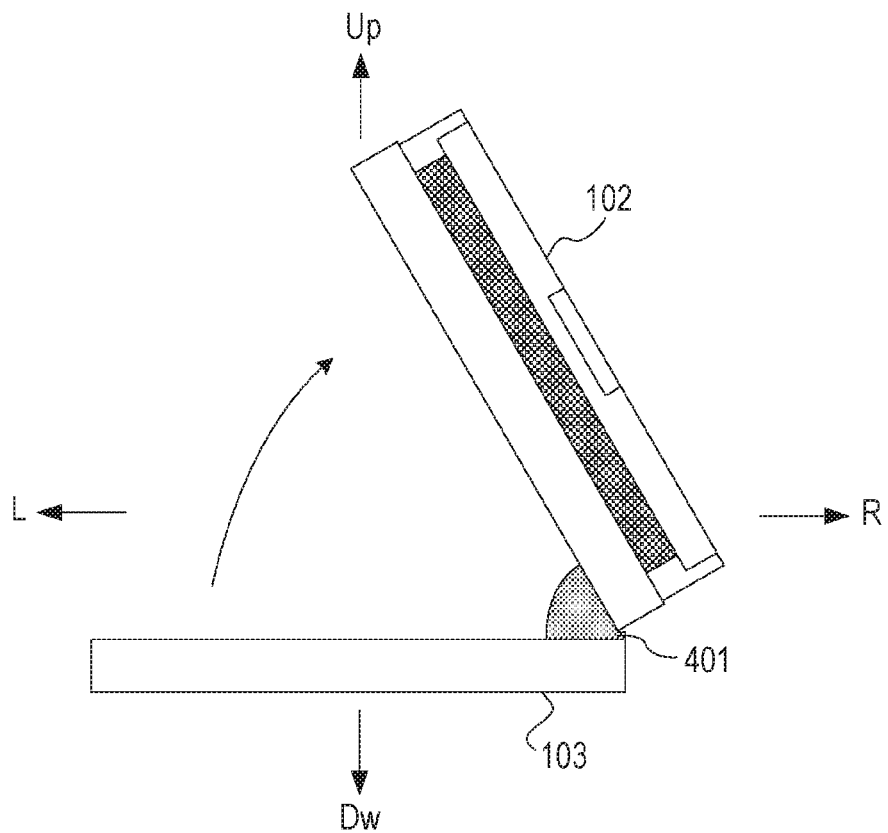

As illustrated in FIG. 4B, the image forming apparatus 100 has a hinge unit 401. The hinge unit 401 connects a lower end on the right R side of the ADF 102 and an upper end on the right R side of the reader unit 103. The ADF 102 can rotate by a predetermined angle to the upper Up side about the hinge unit 401 as its rotation axis. The state acquired as a result of the rotation to the upper Up side of the ADF 102 is the state that the ADF 102 is open. When the ADF 102 is open, a user can set a document on the platen glass 213. The hinge unit 401 may connect a lower end of the left L side of the ADF 102 and an upper end of the left L side of the reader unit 103.

The ADF 102 is openable and closable.

A detection sensor is attached to the hinge unit 401 and has the same structure as that of the document detection sensor 202 described with reference to FIGS. 3A and 3B. In accordance with an opening or closing of the ADF 102, the movable flag of the detection sensor moves, and an output signal from the detection sensor thus changes. Therefore, the detection sensor can detect the state of the ADF 102, that is, whether the ADF 102 is closed or open. The ADF 102 is an example of an openable and closable member of the present invention from the viewpoint described with reference to FIGS. 4A and 4B.

Figure 5A:
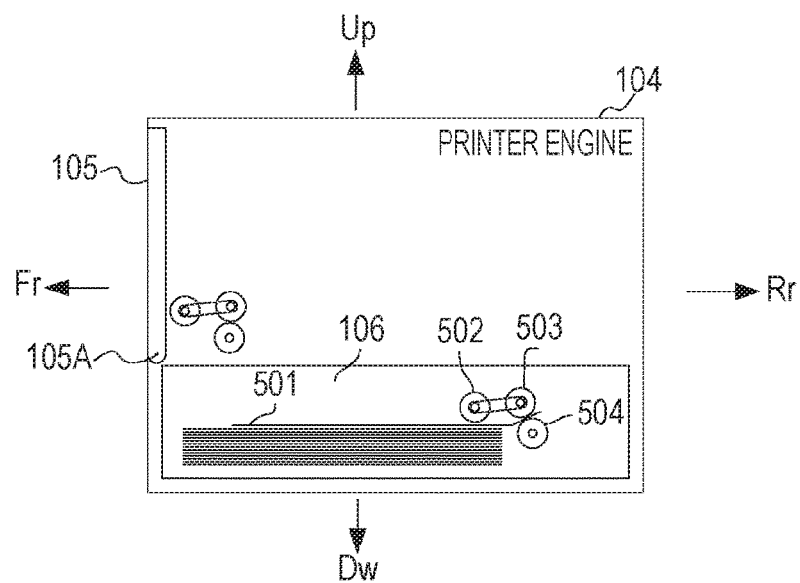
FIGS. 5A to 5C are sectional views illustrating a configuration of a printer engine.
Figure 5B:
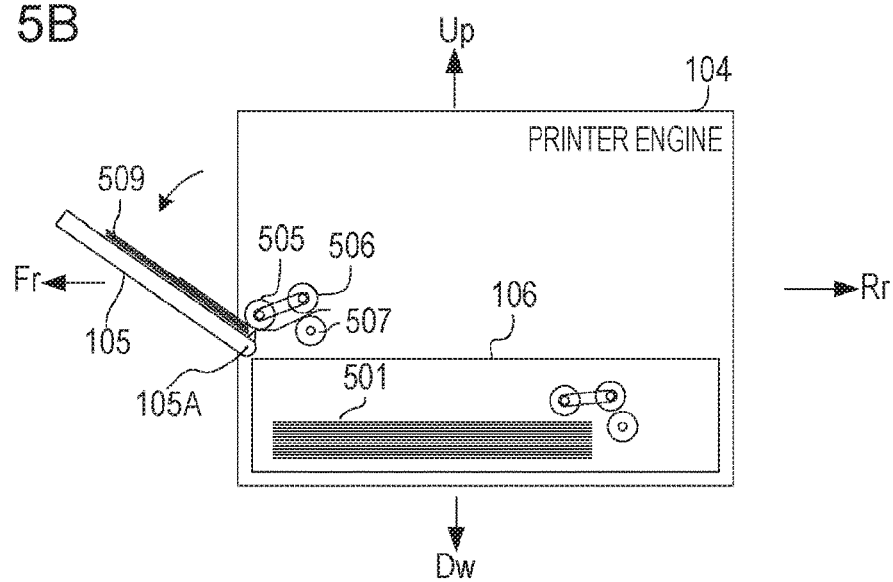
Figure 5C:
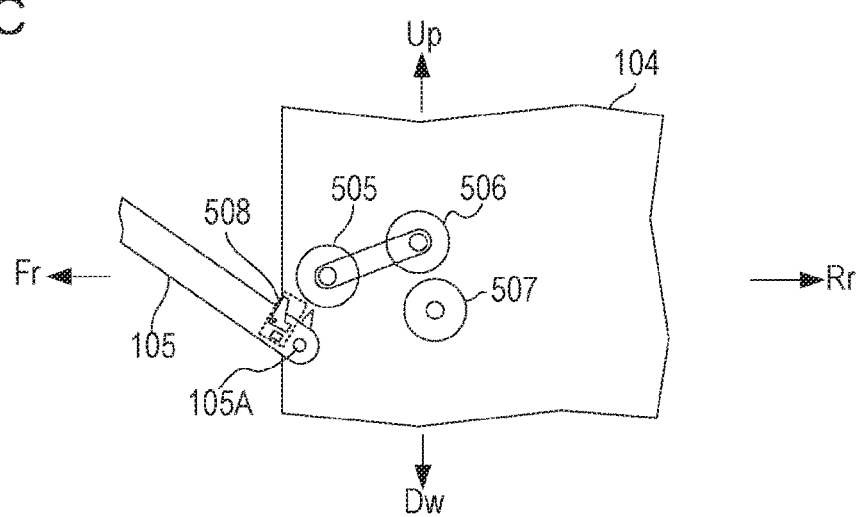

Next, with reference to FIGS. 5A to 5C, the opening and closing of the manual feed tray 105 and operations of the printer engine 104 will be described.

First, with reference to FIG. 5A, a state that the manual feed tray 105 is closed will be described. FIG. 5A is a sectional view of the printer engine 104 when the manual feed tray 105 closed.

When the manual feed tray 105 is closed, a surface of the manual feed tray 105 on which a sheet is to be set is not externally exposed. For printing by the printer engine 104 under the condition, one of sheets 501 stored in the paper cassette 106 is separated and is conveyed to an internal part of the printer engine 104. This conveyance uses a paper cassette separation roller 502, a paper cassette conveyance roller 503, and a paper cassette carrying roller 504 included in the printer engine 104.

Next, with reference to FIG. 5B, a state that the manual feed tray 105 is open will be described. FIG. 5B is a sectional view of the printer engine 104 when the manual feed tray 105 is open.

The manual feed tray 105 has a rotation axis 105A at its end, and the manual feed tray 105 can rotate by a predetermined angle about the rotation axis 105A. The manual feed tray 105 that is closed as illustrated in FIG. 5A may be rotated to be pulled out to the front Fr side so that the surface of the manual feed tray 105 on which sheets 509 are to be set can be externally exposed and the manual feed tray 105 can be opened as illustrated in FIG. 5B. For printing by the printer engine 104 under this condition, one of the sheets 509 set on the manual feed tray 105 may be separated and be conveyed to an internal part of the printer engine 104. The conveyance uses a manually-fed-sheet separation roller 505, a manually-fed-sheet conveyance roller 506, and a manually-fed-sheet carrying roller 507 included in the printer engine 104.

Next, with reference to FIG. 5C, a sheet detection sensor 508 included in the printer engine 104 will be described. FIG. 5C is a partially enlarged view of the printer engine 104.

The sheet detection sensor 508 is a sensor having the same structure as that of the document detection sensor 202 described with reference to FIGS. 3A and 3C and is attached closely to the rotation axis 105A in the manual feed tray 105. In accordance with whether a sheet is set on the manual feed tray 105 or not, the movable flag of the sheet detection sensor 508 moves so that an output signal of the sensor changes. The sheet detection sensor 508 is capable of detecting whether a sheet is set on the manual feed tray 105 or not. The manual feed tray 105 is an example of a setting member of the present invention.

Figure 6A:
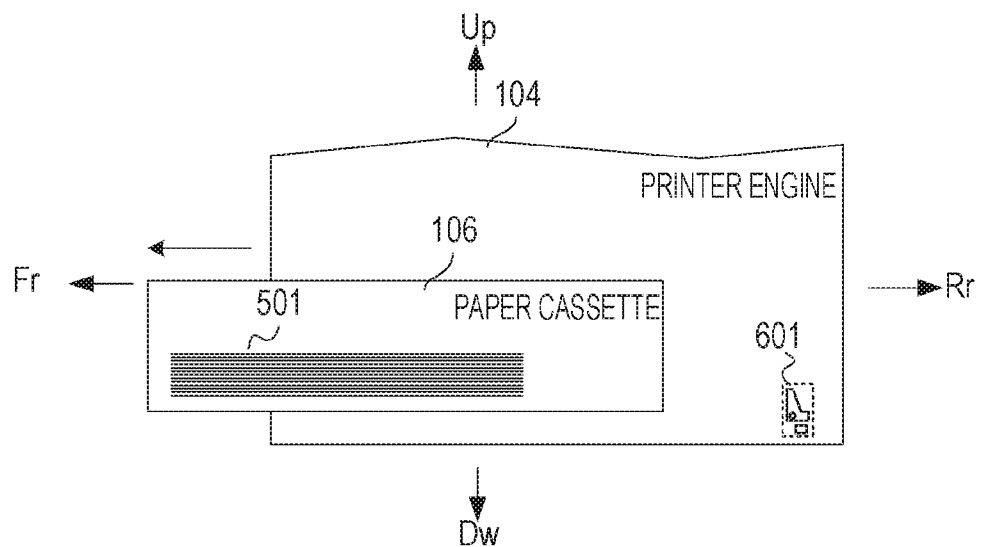
FIGS. 6A and 6B are sectional views illustrated an enlarged view of surroundings of a paper cassette in the printer engine.
Figure 6B:
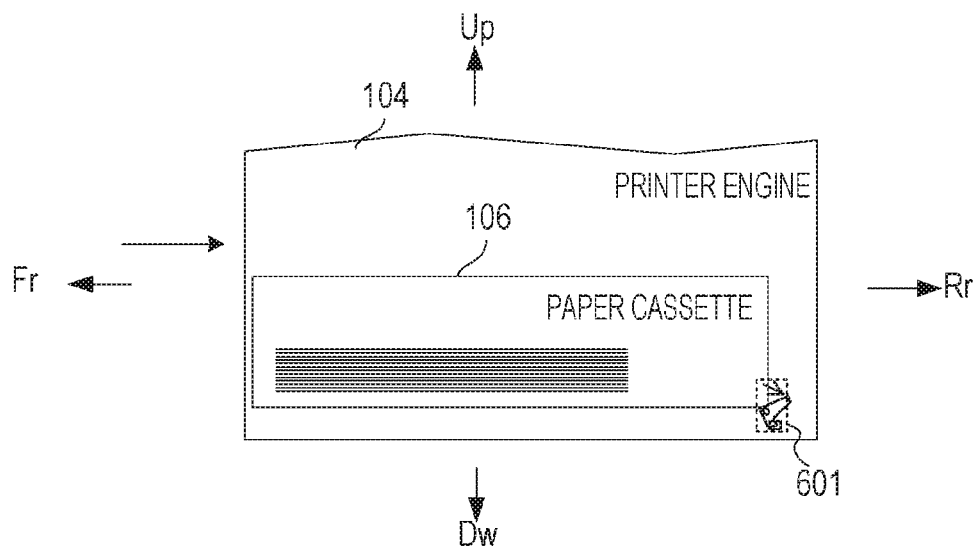

Next, with reference to FIGS. 6A and 6B, opening and closing of the paper cassette 106 will be described. FIG. 6A is a partially sectional view of the printer engine 104 when the paper cassette 106 is palled out (open state). FIG. 6B is a partially sectional view of the printer engine 104 when the paper cassette 106 is pushed in (closed state). The paper cassette 106 is retractably provided.

As illustrated in FIGS. 6A and 6B, the printer engine 104 includes an open/close detection sensor 601. The open/close detection sensor 601 is a sensor having the same structure as that of the document detection sensor 202 described with reference to FIGS. 3A and 3B and is attached to position facing the rear Rr side of the closed paper cassette 106. The open/close detection sensor 601 has a movable flag configured to move in accordance with the opening and closing of the paper cassette 106 so that an output signal from the open/close detection sensor 601 can change. Thus, the open/close detection sensor 601 is capable of detecting the state of the paper cassette 106, that is, whether the paper cassette 106 is closed or open. The paper cassette 106 is an example of a drawer member of the present invention.

Next, with reference to FIG. 7, a hardware configuration of the controller 107 will be described. FIG. 7 is a hardware configuration diagram of the controller 107.

A CPU 701 is a central processing unit configured to generally control the image forming apparatus 100 and is connected to components via a bus.

A RAM 702 is a system work memory usable by the CPU 701 to operate and is configured to store calculation data and programs to be used by the CPU 701. The RAM 702 is also usable as an image memory configured to hold image data having undergone various image processes in the image processing unit 707 for printing, for example.

A ROM 703 is a boot ROM and is configured to store a boot program for the image forming apparatus 100.

An HDD 704 is a nonvolatile secondary storage device configured to store large volume programs and data. The programs and data stored in the HDD 704 may be decompressed in the RAM 702 for use. The HDD 704 may be a nonvolatile memory such as a solid state drive (SSD).

A detection sensor control unit 705 is configured to directly control the detection sensors (202, 401, 508, 601) as described above and perform control over light emission by the photo interrupter, acquisition of edges of sensor output signals, latch processing, and chattering removal. The detection sensor control unit 705 is an example of a sensor control unit according to the present invention.

An operating unit IF 706 is an interface usable for inputting/outputting to and from an operating unit 712 configured by a liquid crystal touch panel, for example. The operating unit IF 706 may be used for outputting image data to the operating unit 712 and transmitting information input by a user through the operating unit 712 to the CPU 701.

An image processing unit 707 is configured to perform image processing, such as correction, processing and editing on input image data read by the reader unit 103. The image processing unit 707 is further configured to perform processing such as color conversion, filtering processing, and resolution conversion on output image data to be output to the printer engine 104.

An external IF 708 is an interface for a telephone network, a wired LAN, a wireless LAN, and a USB, for example. The image forming apparatus 100 is configured to perform data communication with an external apparatus through the external IF 708.

A device IF 709 is an interface configured to connect the reader unit 103 and the printer engine 104 and the controller 107.

Figure 8:
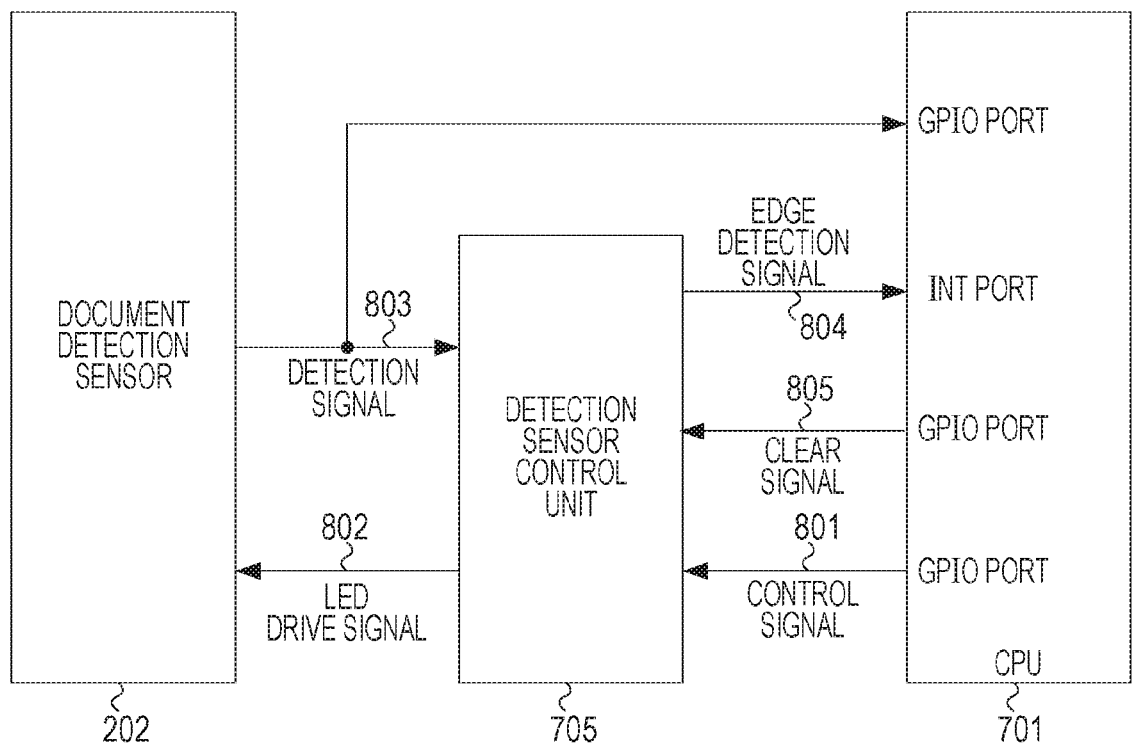
FIG. 8 is a block diagram illustrating a connection relation among a CPU, a detection sensor control unit, and a document detection sensor.

Next, with reference to FIG. 8, a connection relationship among the CPU 701, the detection sensor control unit 705, and the document detection sensor 202 will be described. FIG. 8 is a block diagram illustrating a connection relationship among the CPU 701, the detection sensor control unit 705, and the document detection sensor 202.

The CPU 701 includes at least one INT port and three GPIO (General Purpose Input/Output) ports. The CPU 701 outputs a control signal 801 and a clear signal 805 to the document detection sensor 202. The control signal 801 and the clear signal 805 are output via different GPIO ports. The detection sensor control unit 705 is configured to output an edge detection signal 804 to the CPU 701. The edge detection signal 804 is output to the INT port of the CPU 701. The detection sensor control unit 705 is configured to output an LED drive signal 802 to the document detection sensor 202.

The document detection sensor 202 is configured to output a detection signal 803 to the CPU 701 and the detection sensor control unit 705. The CPU 701 is configured to receive the detection signal 803 through one of the GPIO ports.

Figure 9:
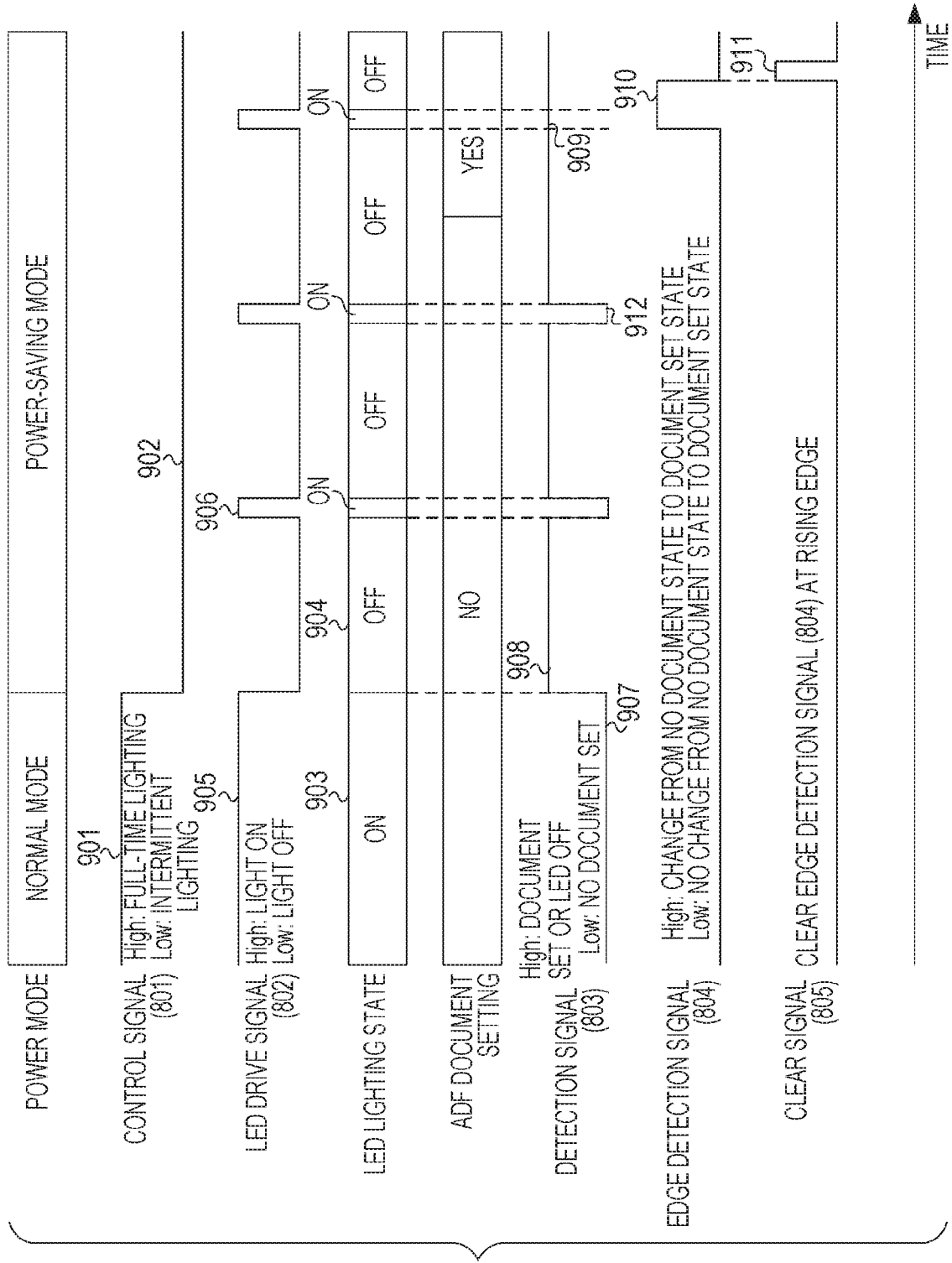
FIG. 9 is a timing chart illustrating signals exchanged among the CPU, the detection sensor control unit, and the document detection sensor.

Next, with reference to FIG. 9, roles of signals will be described. FIG. 9 is a timing chart of signals to be exchanged among the CPU 701, the detection sensor control unit 705, and the document detection sensor 202.

The control signal 801 is a 1-bit signal output from one of the GPIO ports of the CPU 701 and is usable for controlling an output pattern of the LED drive signal 802, which will be described below. The control signal 801 is a signal that controls an output value in accordance with a power mode of the image forming apparatus 100 and outputs a High state 901 (hereinafter, High 901) in a normal mode and outputs a Low 902 (hereinafter, Low 902) in a power-saving mode according to this embodiment.

The LED drive signal 802 is a 1-bit signal output from the detection sensor control unit 705 on the basis of the control signal 801. When the LED drive signal 802 has a High state, the light emitting unit in the document detection sensor 202 lights on 903, while when the LED drive signal 802 has a Low state, the light emitting unit of the document detection sensor 202 lights off 904. When the control signal 801 has the High 901 state, the LED drive signal 802 is output as having the High 905 state at all times. When the control signal 801 has a Low, the LED drive signal 802 exhibits an intermittent output 906 in which a High state and a Low state are periodically repeated. When the LED drive signal 802 is changed to exhibit the intermittent output 906, the light emitting unit in the document detection sensor 202 intermittently lights on in response to the LED drive signal 802. In other words, a state that the light emitting unit in the document detection sensor 202 lights on and a state that the light emitting unit lights off are periodically and alternately repeated. The cycles of the time of the High output and the time of Low output of the LED drive signal 802 when the intermittent output 906 is exhibited are uniquely predetermined.

The detection signal 803 is an output signal from the document detection sensor 202 and changes in response to a light-on state of the light emitting unit in the document detection sensor 202 or a document setting state of the ADF 102.

When the light emitting unit in the document detection sensor 202 lights on and a document is not set on the document tray 201 in the ADF 102, the detection signal 803 outputs Low 907.

When the light emitting unit in the document detection sensor 202 lights on and a document is set on the document tray 201 in the ADF 102, the detection signal 803 outputs High 909.

On the other hand, when the light emitting unit in the document detection sensor 202 lights off, High 908 is output whether or not a document is set on the document tray 201 in the ADF 102. The detection signal 803 outputs High in two cases of a case where "the light emitting unit in the document detection sensor 202 lights off" and a case where "the light emitting unit in the document detection sensor 202 lights on and a document is set on the document tray 201 in the ADF 102".

The detection signal 803 keeps its state when the light emitting unit lights off whether or not a document is set on the document tray 201 in the ADF 102. Thus, the document setting state of the ADF 102 cannot be identified uniquely from the detection signal 803. On the other hand, the detection signal 803 represents whether a document is set on the document tray 201 in the ADF 102 or not when the light emitting unit lights on. The document setting state of the ADF 102 can be identified uniquely from the detection signal 803. The state that the light emitting unit in the document detection sensor 202 lights on is an example of a first state of the present invention. The state that the light emitting unit in the document detection sensor 202 lights off is an example of a second state of the present invention.

Conditions for allowing the CPU 701 to uniquely identify the document setting state of the ADF 102 from the detection signal 803 will be described. When a control signal 801 output from the CPU 701 has a High state, the light emitting unit in the document detection sensor 202 lights on. In this case, the document setting state of the ADF 102 can be uniquely identified from the detection signal 803. Therefore, the control signal 801 having a High state is a condition for allowing the CPU 701 to uniquely identify the document setting state of the ADF 102 from the detection signal 803.

On the other hand, when the control signal 801 output from the CPU 701 has a Low state, the light emitting unit in the document detection sensor 202 intermittently lights on. Because the intermittent light-on is controlled not by the CPU 701 but by the detection sensor control unit 705, the CPU 701 does not have information describing whether the light emitting unit in the document detection sensor 202 is lighting on or not at a certain instance. The states that the light emitting unit in the document detection sensor 202 lights off and that the detection signal 803 has a High state correspond to one of the following cases. That is, they correspond to one of a "case where the light emitting unit in the document detection sensor 202 lights off" and a "case where the light emitting unit in the document detection sensor 202 lights on and a document is set on the document tray 201 in the ADF 102". Therefore, when the control signal 801 has a Low state, the CPU 701 cannot identify the document setting state of the ADF 102 uniquely from the detection signal 803.

The edge detection signal 804 is a 1-bit signal output from the detection sensor control unit 705 to the CPU 701 on the basis of the LED drive signal 802 and the detection signal 803. The edge detection signal 804 holds a High 910 state (hereinafter, simply called. High 910) when the detection signal 803 changes from a Low 912 state (hereinafter, Low 912) to a High 909 state (hereinafter, High 909) in an interval when the LED drive signal 802 has a High state. Thus, the edge detection signal 804 may be considered as a signal that notifies a change from a state that a document is not set on the document tray 201 in the ADF 102 to a state that a document is set thereon.

The clear signal 805 is a 1-bit signal output from one of the GPIO ports of the CPU 701 and clears a latch of the edge detection signal 804. The clear signal 805 has High 911 to clear the latch of the edge detection signal 804.

The edge detection signal 804 as described above is a signal that notifies a change from the state that a document is not set on the document tray 201 in the ADF 102 to a state that a document is set thereon. However, if the clear signal 805 clears the latch of the edge detection signal 804 with a document kept set on the document tray 201 in the ADF 102, the edge detection signal 804 is changed to Low though a document is set on the document tray 201 in the ADF 102. Thus, the CPU 701 may not grasp the document setting state of the ADF 102 by monitoring the edge detection signal 804.

In order to grasp the document setting state of the ADS 102 in any cases, the detection signal 803 is also output to the CPU 701, as illustrated in FIG. 8. How the CPU 701 monitors the detection signal 803 will be described below.

Figure 10:
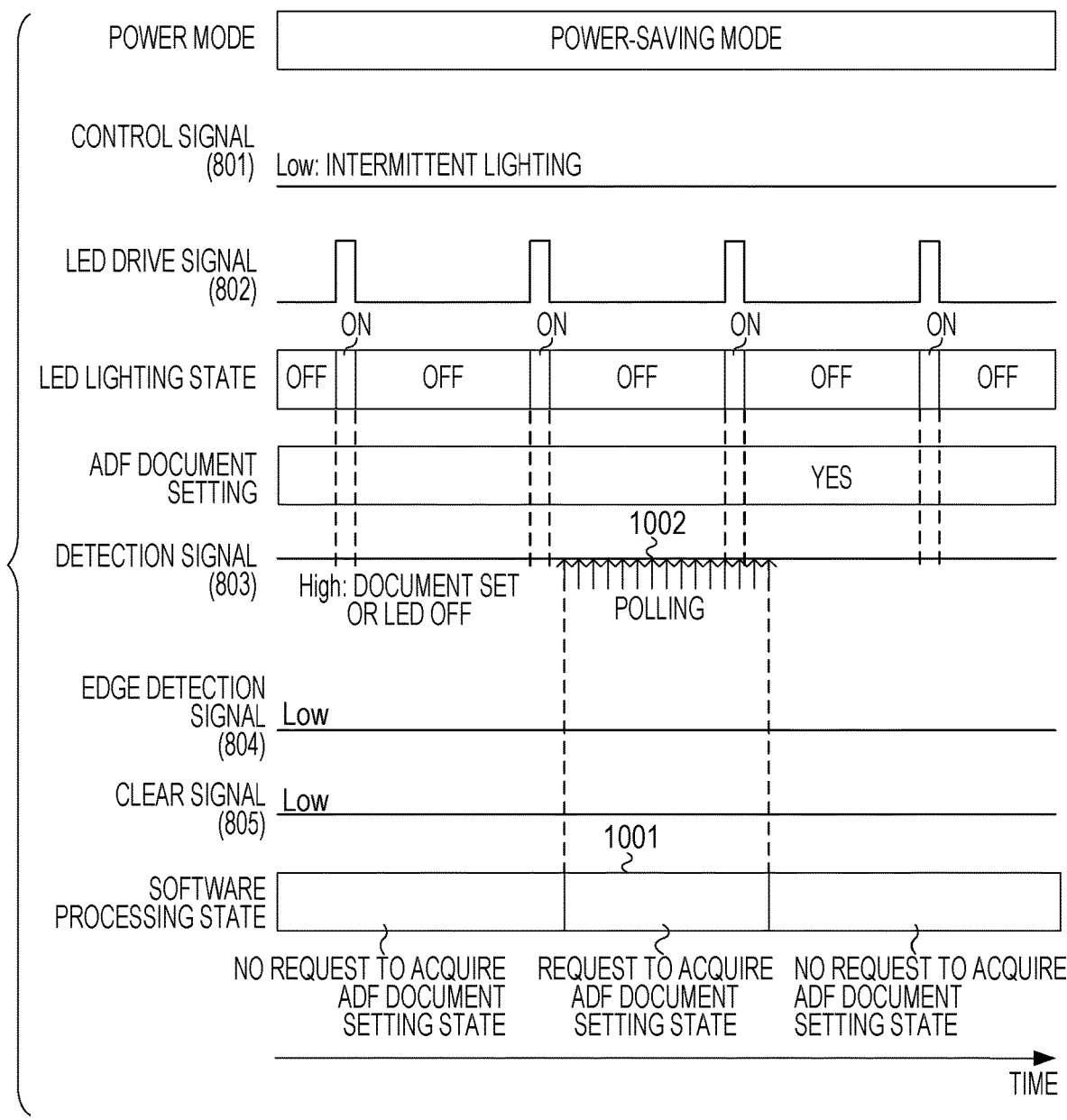
FIG. 10 is a timing chart illustrating signals exchanged among a CPU, a detection sensor control unit, and a document detection sensor in a comparison example.

First, with reference to FIG. 10, how a CPU in an image forming apparatus according to a comparison example monitors the detection signal 803 will be described. The image forming apparatus according to the comparison example has the same configuration as that of the image forming apparatus 100 according to this embodiment, and like numbers refer to like parts in the image forming apparatus according to the comparison example and the image forming apparatus 100. FIG. 10 is a timing chart of signals exchanged among the CPU 701, detection sensor control unit 705, and document detection sensor 202 in the image forming apparatus according to the comparison example.

FIG. 10 illustrates a state after the edge detection signal 804 is cleared by the clear signal 805 with a document kept set on the ADF 102. Thus, the edge detection signal 804 has a Low state though a document is set on the document tray 201 in the ADF 102.

In order to determine from the detection signal 803 whether a document is set on the document tray 201 in the ADF 102 or not, the lighting state of the light emitting unit in the document detection sensor 202 is required. This is because the detection signal 803 is output with a High state in two cases of a "case where the light emitting unit in the document detection sensor 202 lights off" and a "case where the light emitting unit, in the document detection sensor 202 lights on and a document is set on the document tray 201 in the ADF 102".

However, in a power-saving mode, the light emitting unit in the document detection sensor 202 is controlled by the detection sensor control unit 705 so as to intermittently light on. Thus, in the power-saving mode, the light-on state of the light emitting unit in the document detection sensor 202 is not informed to the CPU 701.

Accordingly, the CPU 701 in the image forming apparatus according to the comparison example polls the detection signal 803 for a predetermined or longer period in the power-saving mode in order to identify the document setting state of the ADF 102. The predetermined period is equal to a cycle of intermittent light-on operations of the light emitting unit in the document detection sensor 202, that is, a total of one light-on period and one light-off period of the light emitting unit in the document detection sensor 202.

The CPU 701 polls the detection signal 803 for the predetermined or longer period to receive the detection signal 803 when the light emitting unit in the document detection sensor 202 lights on. Thus, when the CPU 701 receives the detection signal 803 having a Low state once or more times during the polling, it means that a document is not set on the document tray 201 in the ADF 102. When the CPU 701 does not receive the detection signal 803 having a Low even once during the polling, it means that a document is set on the document tray 201 in the ADF 102.

When a software program issues a request 1001 to acquire a document setting state of the ADF 102, the CPU 701 polls 1002 the detection signal 803 for a predetermined period. In the example illustrated in FIG. 10, the CPU 701 does not receive the detection signal 803 having a Low during the polling even once. Therefore, the CPU 701 determines that a document is set on the document tray 201.

The image forming apparatus of the comparison example applying this method can identify the document setting state of the ADF 102 by monitoring the detection signal 803 even in a period when the light emitting unit in the document detection sensor 202 lights off.

However, the method in which polling is performed as in the image forming apparatus of the comparison example may lack a real time property in addition to an increased load imposed by the polling operation on the CPU 701 in a power-saving mode. Accordingly, the image forming apparatus 100 of this embodiment determines the document setting state of the ADF 102 by applying a method which will be described below.

Figure 11:
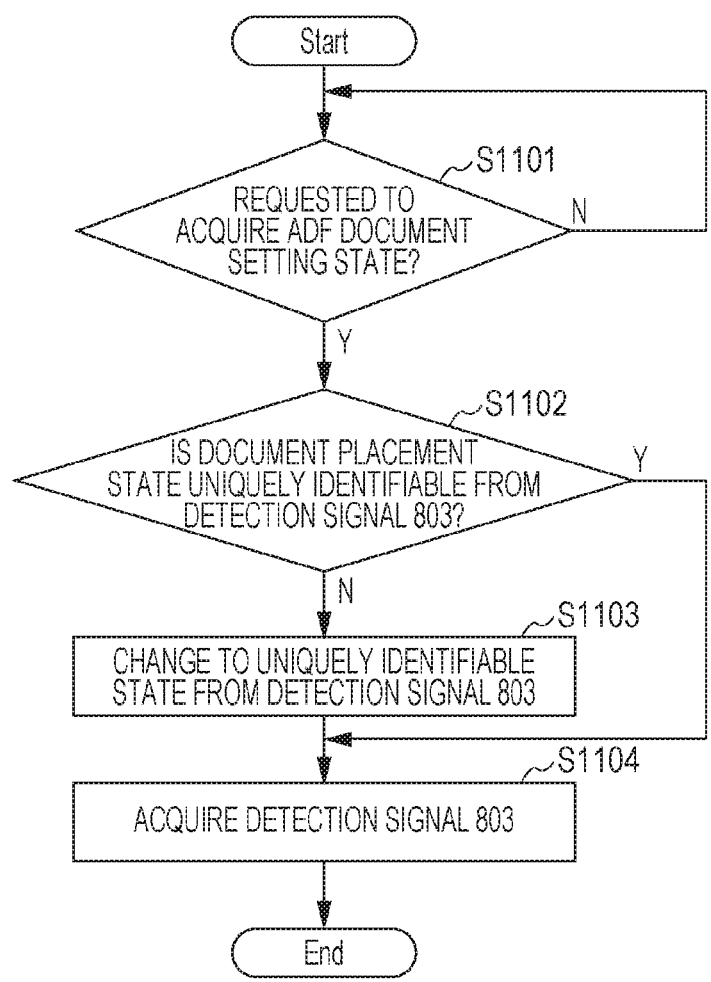
FIG. 11 is a flowchart illustrating processing for determining a document setting state on the ADF.

First, with reference to FIG. 11, processing for determining a document setting state of the ADF 102 will be described FIG. 11 is a flowchart illustrating processing for determining a document setting state of the ADF 102. It should be understood that the processing illustrated in FIG. 11 is an example of processing to be performed by the control unit according to the present invention.

In step S1101, the CPU 701 judges whether a software program transmits a request to acquire a document setting state of the ADS 102 (hereinafter, called an acquisition request) or not. If the acquisition request is issued, the CPU 701 advances the processing to step S1102. If not, the processing returns to step S1101. The acquisition request may be transmitted from a scan driver installed in an external apparatus, for example. The external apparatus may be connected to the image forming apparatus 100 in a wireless or wired manner. The acquisition request may be transmitted by a software program executed by the CPU 701.

In step S1102, the CPU 701 judges whether the document setting state of the ADF 102 is uniquely identifiable from the detection signal 803 or not.

If the control signal 801 has a Low state, the CPU 701, as described above, cannot uniquely identify the document setting state of the ADS 102 from the detection signal 803 only. Thus, if the control signal 801 has a Low state, the CPU 701 determines that the document setting state of the ADF 102 is not uniquely identifiable from the detection signal 803, and the processing moves to step S1103.

On the other hand, if the control signal 801 has a High state, the CPU 701 can uniquely identify the document setting state of the ADF 102 from the detection signal 803. Therefore, if the control signal 801 has a High, the CPU 701 determines that the document setting state of the ADF 102 is uniquely identifiable from the detection signal 803, and the processing moves to step S1104.

In step S1103, the CPU 701 can uniquely identify the document setting state of the ADF 102 from the detection signal 803. More specifically, the CPU 701 chances the control signal 801 to a High state to change the control over the document detection sensor 202 by the detection sensor control unit 705.

In step S1104, the CPU 701 acquires the detection signal 803. If the detection signal 803 has a Low state, the CPU 701 judges that a document is not set on the document tray 201 in the ADF 102. If the detection signal 803 has a High state, the CPU 701 judges that a document is set on the document tray 201 in the ADF 102. The CPU 701 transmits the judgment result to a source of the acquisition request for a document setting state.

In the power-saving mode, the CPU 701 after acquiring the detection signal 803 changes the control signal 801 to a Low state.

Figure 12:
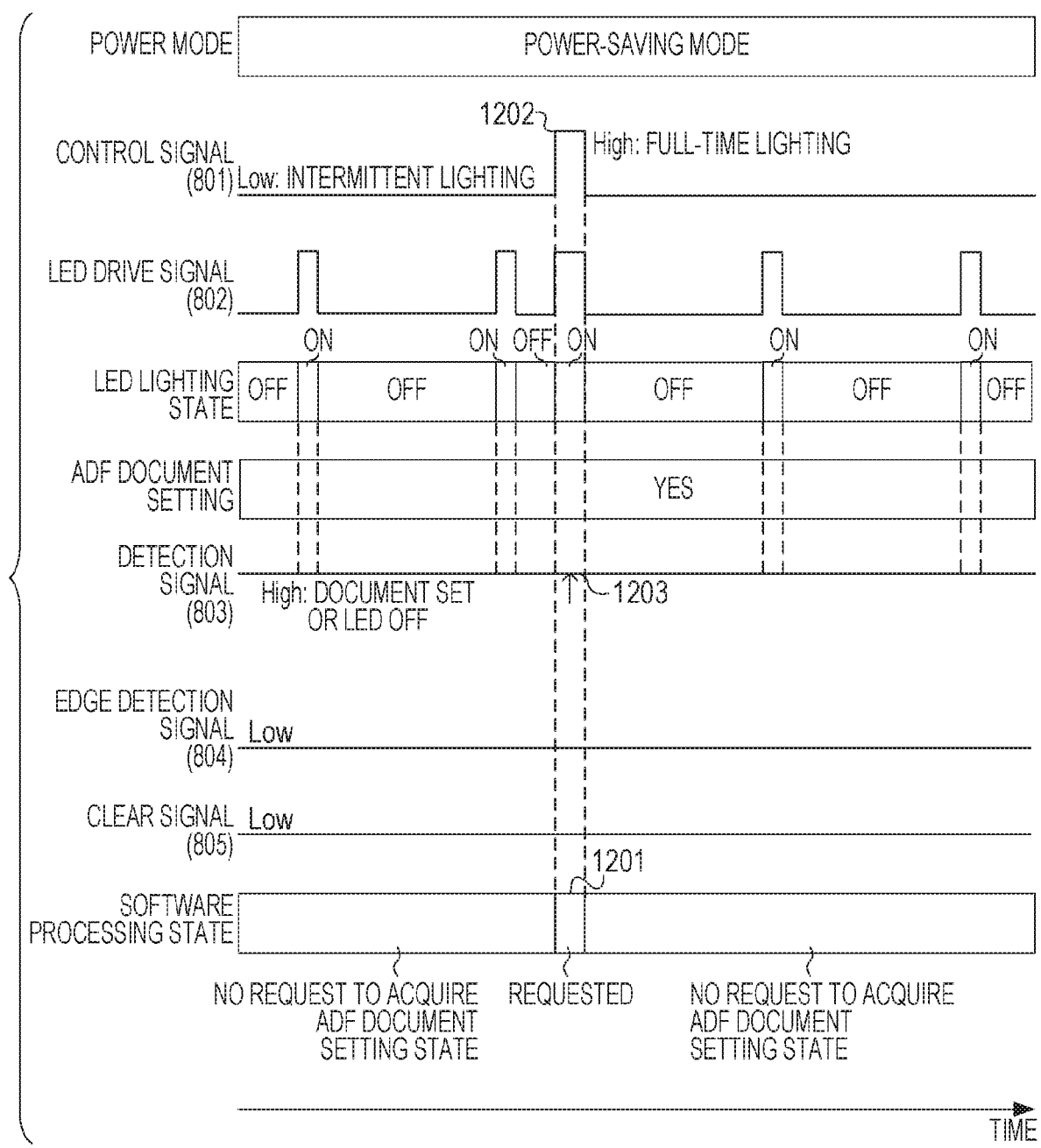
FIG. 12 is a timing chart illustrating signals exchanged among the CPU, the detection sensor control unit, and the document detection sensor for determination of a document setting state in the ADF.

Next, with reference to FIG. 12, movements of signals for determination of a document setting state of the ADF 102 will be described. FIG. 12 is a timing chart illustrating signals exchanged among the CPU 701, the detection sensor control unit 705, and the document detection sensor 202 for determination of a document setting state of the ADS 102.

FIG. 12 illustrates a state after the edge detection signal 804 clears the clear signal 805 with a document set in the ADF 102. Thus, though a document is set on the document tray 201 in the ADF 102, the edge detection signal 804 has a Low state.

FIG. 12 assumes that when the image forming apparatus 100 is in the power-saving mode, a software program transmits an acquisition request 1201 for a document setting state of the ADF 102. In this case, the control signal 801 has a Low state, and the CPU 701 determines that the document setting state of the ADF 102 is not uniquely identifiable from the detection signal 803 only. Next, the CPU 701 changes the control signal 801 to a High state to enable the document setting state of the ADF 102 to be identified uniquely from the detection signal 803. Next, the CPU 701 acquires the detection signal 803 to acquire a document setting state of the ADF 102. Next, the CPU 701 changes the control signal 801 to a Low state.

Next, the image forming apparatus according to the comparison illustrated in FIG. 10 and the image forming apparatus 100 of this embodiment are compared.

In the image forming apparatus according to the comparison, when the image forming apparatus is in the power-saving mode as illustrated in FIG. 10, polling must be performed in consideration of a light-on time of the light emitting unit in the document detection sensor 202 for identifying a document setting state of the ADF 102. As a result, an increased load is imposed on the CPU 701 in the image forming apparatus according to the comparison example. Furthermore, the image forming apparatus according to the comparison example may require a time for performing polling, which lacks a real time property.

On the other hand, the image forming apparatus 100 according to this embodiment is not required to perform polling for identifying the document setting state of the ADF 102 even when the image forming apparatus 100 is in the power-saving mode. Thus, the load on the CPU 701 may be suppressed, and the document setting state of the ADF 102 can be identified in real time.

As described above, the document detection sensor 202 has a state that the light emitting unit lights on and the detection signal 803 uniquely represents the document setting state of the ADF 102 or a state that the light emitting unit in the document detection sensor 202 lights off and the detection signal 803 has a predetermined state. The detection sensor control unit 705 further performs control for acquiring a state that the light emitting unit the document detection sensor 202 lights on or control for acquiring a state that the light emitting unit in the document detection sensor 202 intermittently lights on. In response to an acquisition request for a document setting state, the CPU 701 controls the detection sensor control unit 705 so as to cause the light emitting unit in the document detection sensor 202 to light on.

This may eliminate the necessity of polling as in the image forming apparatus according to the comparison example. Thus, an increase of the load on the CPU 701 may be suppressed, and the document setting state of the ADF 102 can be identified from the detection signal 803 in real time. Because the detection sensor control unit 705 controls the document detection sensor 202, the power consumption for controlling the document detection sensor 202 can be suppressed more than a case where the CPU 701 directly controls the document detection sensor 202.

The image forming apparatus 100 has power modes including a normal mode and a power-saving mode. When the image forming apparatus 100 is in the power-saving mode and receives an acquisition request for a document setting state, the CPU 701 controls the detection sensor control unit 705 so as to cause the light emitting unit in the document detection sensor 202 to light on. When the image forming apparatus 100 in the power-saving mode and does not receive an acquisition request for a document setting state, the CPU 701 controls the detection sensor control unit 705 so as to cause the document detection sensor 202 to intermittently on. Thus, when the image forming apparatus 100 is in the power-saving mode, the light emitting unit in the document detection sensor 202 is prevented from lighting on, which suppresses power consumption. Even when the image forming apparatus 100 is in the pow saving mode, a document setting state of the ADF 102 can be identified real time from the detection signal 803 without increasing a load on the CPU 701.

When the image forming apparatus 100 is in the normal mode, the CPU 701 controls the detection sensor control unit 705 so as to cause the light emitting unit in the document detection sensor 202 to light on. Thus, when the image forming apparatus 100 is in the normal mode, the document setting state of the ADF 102 can be identified in real time from the detection signal 803.

Second Embodiment

The image forming apparatus 100 according to a second embodiment includes detection sensors other than the document detection sensor 202 which have the same configuration as that of the document detection sensor 202 described with reference to FIGS. 8, 11 and 12 and operate similarly to operations of the document detection sensor 202. The detection sensors other than the document detection sensor 202 may include, for example, detection sensors attached to the hinge unit 401, the sheet detection sensor 508, and the open/close detection sensor 601.

Thus, in the image forming apparatus 100 even in the power-saving mode, the detection sensor attached to the hinge unit 401 can detect the closed ADF 102 without performing the polling. Also, in the image forming apparatus 100 in the power-saving mode, the sheet detection sensor 508 can detect whether a sheet is set on the manual feed tray 105 or not and can detect whether the paper cassette 106 is closed or not without performing the polling. Therefore, a load to be imposed on the CPU 701 can be suppressed, and the positional states of members included in the image forming apparatus 100 such as the ADF 102 and the paper cassette 106 and a paper state can be identified in real time from the detection signal 803.

Other Embodiments

The image forming apparatus 100 may include a detection sensor configured to detect a state of a predetermined subject such as a position of a predetermined member, excluding the detection sensors described above. For example, the image forming apparatus 100 may include a detection sensor configured to detect a position of the manual feed tray 105, that is, whether the manual feed tray 105 is open or not. The detection sensor has the same configuration as that of the document detection sensor 202 and may operate in the same manner as that of the document detection sensor 202.

According to this embodiment, when the control signal 801 has a Low state, the detection sensor control unit 705 controls the light emitting unit in the document detection sensor 202 so as to intermittently light on. However, when the control signal 801 has a Low state, the detection sensor control unit 705 may control so as to keep the state that the light emitting unit in the document detection sensor 202 lights off.

The present invention may be implemented by processing executed by programs implementing one or more functions according to the aforementioned embodiments where the programs are supplied to a system or an apparatus over a network or through a storage medium and are executed by one or more processors in the computer in the system or the apparatus. The present invention may also be implemented by a circuit (such as an ASIC) implementing one or more functions.

Having described the present invention along with embodiments, the aforementioned embodiments are given only for illustrating concrete examples for implementing the present invention, it should not be intended that the technical scope of the present invention is limitedly interpreted thereby. In other words, the present invention may be implemented in various manners without departing from its technical spirit and scope and main features.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-039253 filed Mar. 1, 2016, which is hereby incorporated by reference herein in its entirety.

What is claimed is:

1. A document scanning apparatus comprising:
   a reader configured to read a document conveyed from a document tray;
   a light emitter controlled to emit light at predetermined intervals;
   a light receiver configured to receive the light emitted from the light emitter, wherein whether the light receiver receives the light emitted from the light emitter or not depends on whether a document is set on the document tray or not;
   a processor configured to;
   receive, from an external apparatus, an predetermined request;
   based on receiving the predetermined request, cause the light emitter to emit the light; and
   transmit, to the external apparatus, data based on whether the light receiver receives the light emitted from the light emitter based on receiving the predetermined request or not.

2. The document scanning apparatus according to claim 1, wherein, based on whether the light receiver receives the light or not, the processor detects that the document is set on the document tray.

3. The document scanning apparatus according to claim 2, wherein, on a basis that the light emitted from the light emitter is not received by the light receiver, the processor detects that the document is set on the document tray.

4. The document scanning apparatus according to claim 1, wherein the request is an inquiry about whether the document is set on the document tray or not.

5. The document scanning apparatus according to claim 1 capable of operating in a first power state and a second power state, power consumption in the second power state being lower than power consumption in the first power state, wherein the light emitter always performs light emission when in the first power state and performs light emission at the predetermined intervals when in the second power state.

6. The document scanning apparatus according to claim 5, further comprising a power controller configured to, when in the second power state, on a basis of a change in the light receiving result input from the light receiver, output a shift instruction for shifting from the second power state to the first power state.

7. The document scanning apparatus according to claim 6, wherein the processor shifts a power state of the document scanning apparatus from the second power state to the first power state on a basis of the shift instruction from the power controller.

8. The document scanning apparatus according to claim 7, wherein whether the light receiver receives the light emitted from the light emitter or not is input to both the power controller and the processor.

9. The document scanning apparatus according to claim 6, wherein the shift instruction is an interrupt signal to the processor.

10. The document scanning apparatus according to claim 1, wherein whether the light receiver receives the light emitted from the light emitter or not is input to a GPIO (General Purpose Input/Output) port of the processor.

11. The document scanning apparatus according to claim 1, further comprising a member that is moved to a position between the light emitter and the light receiver when a document is set on the document tray.

12. The document scanning apparatus according to claim 1,
   wherein the light emitter emits at the predetermined intervals after the processor acquires a signal regarding whether the light receiver receives the light emitted from the light emitter based on receiving the predetermined request or not.

13. The document scanning apparatus according to claim 1,
   wherein, based on receiving the predetermined request, the processor causes the light emitter to perform light emission in addition to light emission based on the predetermined time intervals.

14. The document scanning apparatus according to claim 1, further comprising:
   a light emission controller configured to cause the light emitter to turn on at the predetermined intervals;
   wherein the processor, based on receiving the predetermined request, notifies the light emission controller to cause the light emitter to perform light emission.

15. The document scanning apparatus according to claim 1, wherein the processor causes the light emitter to emit the light at the predetermined intervals after the emission based on receiving the predetermined request.

16. A control method for a document scanning apparatus having a reader configured to read a document conveyed from a document tray, a light emitter, and a light receiver configured to receive the light emitted from the light emitter, the method comprising:
   performing light emission control to cause the light emitter to emit light at predetermined time intervals;
   receiving, from an external apparatus, a request;
   causing the light emitter to perform light emission on a basis of the request received in the receiving;

transmitting, to the external apparatus, data based on whether the light receiver receives the light emitted from the light emitter based on receiving the predetermined request or not.

17. A document scanning apparatus; comprising:
a light emitter controlled to emit light at predetermined intervals;
a light emitting unit controlled to emit light at predetermined interval;
a light receiver configured to receive the light emitted from the light emitter, wherein whether the light receiver receives the light emitted from the light emitter or not depends on whether a document is set on the document tray or not;
a processor configured to;
receive, from an external apparatus, an predetermined request; and
cause the light emitter to emit light, in addition to light emission based on the predetermined intervals, based on receiving the predetermined request;
transmit, to the external apparatus, data based on whether the light receiver receives the light emitted from the light emitter based on receiving the predetermined request or not.

\* \* \* \* \*